S. J. GILL.
AUTOMOBILE STARTER.
APPLICATION FILED MAR. 8, 1911.
1,007,094.
Patented Oct. 31, 1911.
2 SHEETS—SHEET 1.
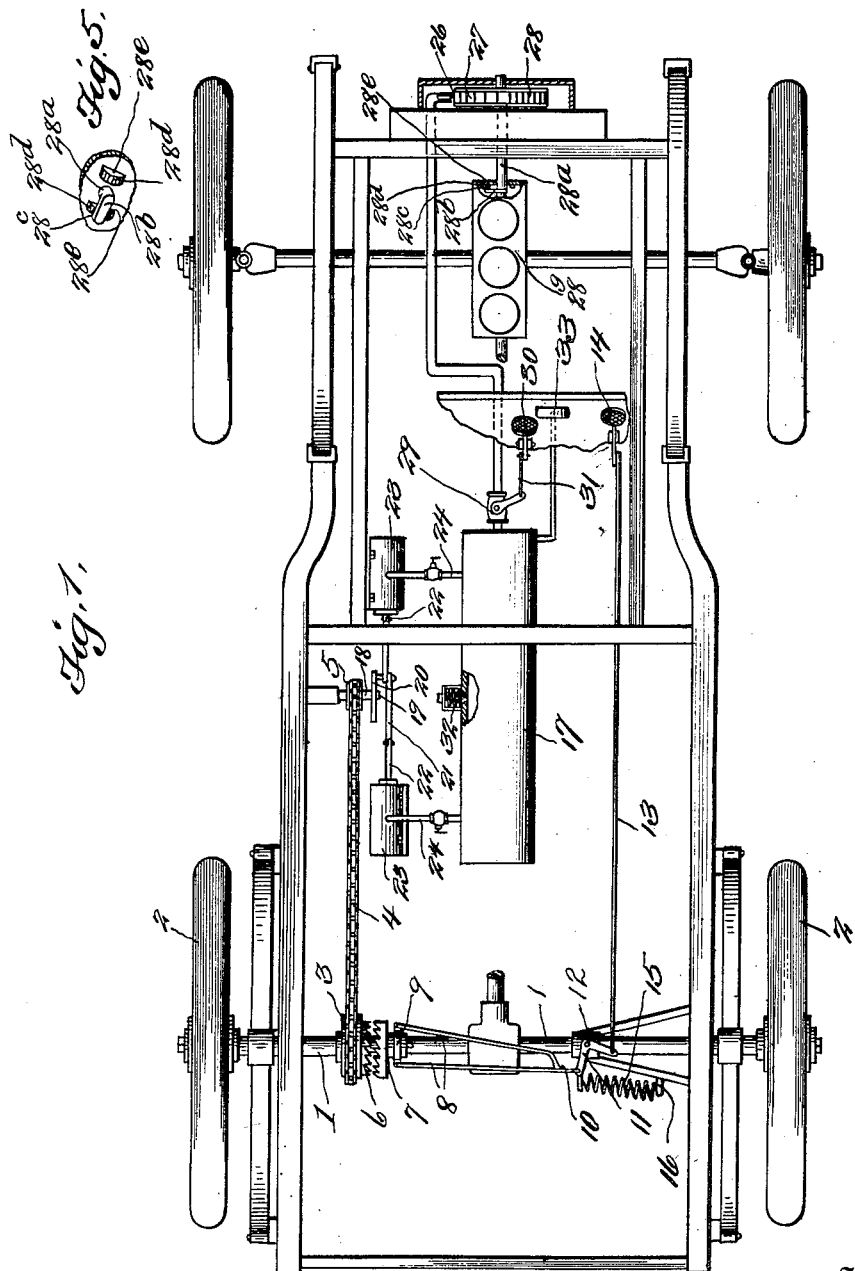

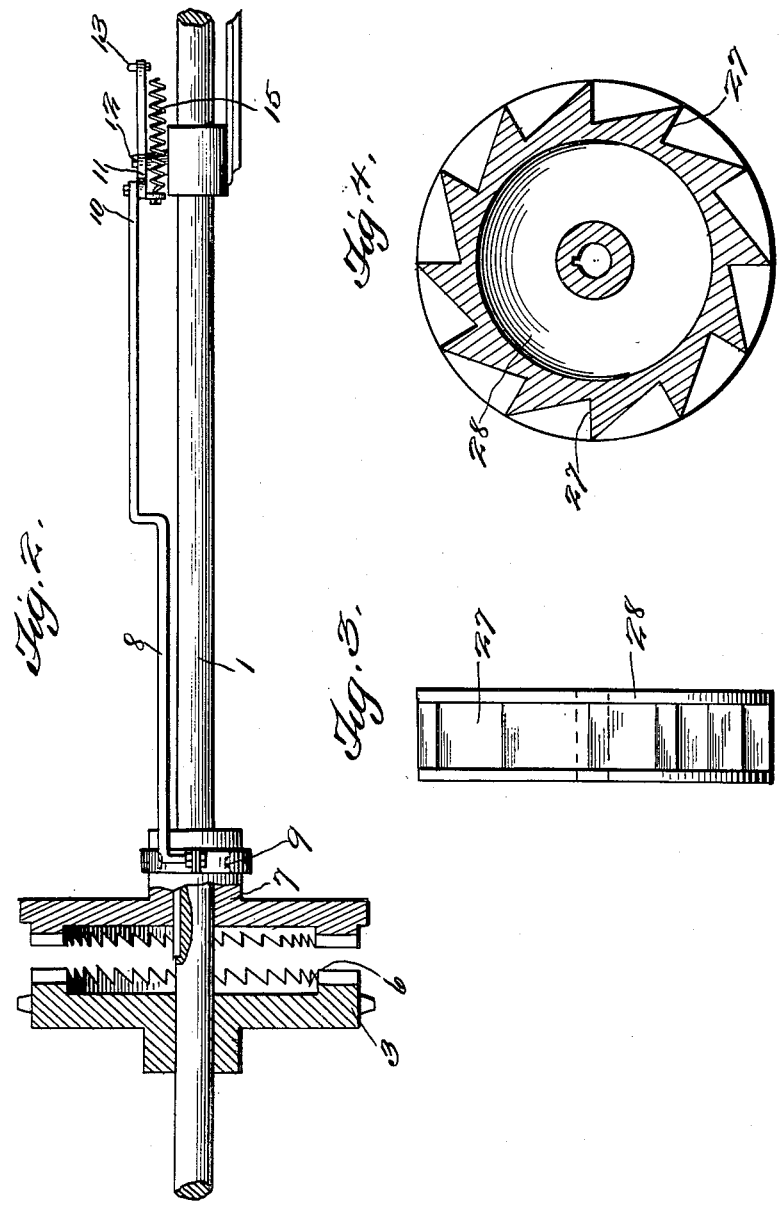

UNITED STATES PATENT OFFICE.

STONEWALL JACKSON GILL, OF ROANOKE, VIRGINIA.

AUTOMOBILE-STARTER.

1,007,094.  Specification of Letters Patent.  Patented Oct. 31, 1911.

Application filed March 8, 1911. Serial No. 613,087.

*To all whom it may concern:*

Be it known that I, STONEWALL J. GILL, a citizen of the United States, residing at Roanoke, in the county of Roanoke and State of Virginia, have invented a new and useful Automobile-Starter; and I do hereby declare the following to be a full, clear, and exact description of the invention, such as will enable others skilled in the art to which it appertains to make and use the same.

This invention relates to a new and useful starting device, adapted for use upon automobiles.

The primary object of the invention is to provide means, which may be thrown into operation as the automobile is moving, in order to store air under pressure in a storage tank. The object for storing the air in this manner, is to utilize the same for imparting motion to a fly wheel, by allowing the air under pressure to be thrown against the buckets of the wheel. As this wheel is rotated, sparks are created, which will ignite the explosive charge.

The storage tank is divided with a safety valve, in order to allow the air to blow off, after the required amount of compressed air is forced into the tank. In the drawings, however, there is only disclosed one form of the invention, but in practical fields this form may require alterations, to which the applicant is entitled, provided the alterations are comprehended by the appended claims.

The invention comprises further features and combination of parts, as hereinafter set forth, shown in the drawings and claimed.

In the drawings:—Figure 1 is a plan view of a portion of a motor driven vehicle, showing the application of the starting device, the same being constructed in compliance with the invention. Fig. 2 is an enlarged detail view of the clutch mechanism for throwing the pumps into and out of gear with the driving shaft of the vehicle. Fig. 3 is a view in elevation of the fly wheel, showing the buckets thereof, and illustrating the manner in which the spark is created for igniting the explosive charge. Fig. 4 is a section view through the fly wheel shown in Fig. 3. Fig. 5 is a detail view of the sparking mechanism.

Referring to the drawings 1 designates the driving shaft of a motor driven vehicle, on the ends of which the drive wheels 2 are mounted. Mounted on the shaft 1 is a sprocket wheel 3. This sprocket wheel 3 is loosely mounted on the shaft 1, and surrounding it is a sprocket chain 4, which travels about the sprocket wheel 5. To throw the sprocket wheel 3 into and out of gear with the shaft 1, a clutch member 6 is carried by the sprocket wheel 3, with which clutch member 6 the clutching collar 7 coöperates. The clutching collar 7 is geared to rotate with the shaft 1, but is capable of having a sliding movement upon the shaft. To throw the clutching collar into coöperation with the clutch member the rods 8 are provided, which have a loose ring connection 9 with the collar. The ends 10 of the rods 8 connect with one end of a bell crank lever 11, which is pivoted as at 12. Connected to the other end of the bell crank lever is a rod 13, which connects with the foot pedal or lever 14 adjacent the dash of the automobile. A spring 15 is provided, which connects between one portion of the bell crank lever and the point 16, thus providing means for holding the clutch collar out of coöperation with the clutch member. However, when the foot pedal or lever 14 is depressed, the bell crank lever is rocked against the action of the spring 15, thus throwing the clutch collar into coöperation with the clutch member, so as to transmit motion from the sprocket wheel 3 to the sprocket wheel 5, by virtue of the chain 4. This cycle of operations is accomplished while the automobile is in motion, in order to store air under pressure in the storage tank 17.

The sprocket wheel 5 is mounted upon a shaft 18, in order to rotate therewith. The end 19 of the shaft 18 has mounted thereon a disk 20. Eccentrically connected to the disk 20 are the pitman rods 21, which pivotally connect to the piston rods 22 of the pumps 23. Leading from the pumps 23 are the pipes 24, which convey the air into the storage tank 17. The particular detail structure of the pumps form no part of the present invention, therefore the interior detail structure is not disclosed. However, it is the purpose to utilize double acting pumps, so that air may be forced through the pipes 24 on the forward and backward stroke of the pistons, in order to fill the storage tank rapidly. Leading from one end of the storage tank is a pipe 25, the end of which is provided with a small orifice 26. By this small orifice a fine jet of air may be blasted into the buckets 27 of the wheel 28, so as to impart motion to it. When this wheel 28 is rotated its shaft 28ª is also rotated. On the end of the shaft 28ª an arm 28ᵇ is provided, on one face of which an area of sparking material or metal 28ᶜ is arranged. As the shaft 28ª is rotated by means of the wheel 28, the arm 28ᵇ makes a circular movement, and on each half revolution of the arm the sparking material or metal engages the serrated surfaces 28ᵈ of the members 28ᵉ, thus creating the necessary sparks, whereby the explosive charge in the conventional form of engine 28ᵍ may be ignited. However, the wheel 28 is only rotated when it is desired to start the automobile, that is, after the same has come to rest. The pipe 25 is provided with a valve 29, which is controlled by a lever or treadle 30 arranged adjacent the dash. This lever or treadle 30 has a rod connection 31 with the operating handle of the valve 29. The storage tank 17 is provided with a safety valve 32, in order to relieve the pressure of air therein, in case the air increases over the capacity of the storage tank. The capacity of the storage tank may be any number of pounds of compressed air, but for the purpose of comprehending the various steps of operation, a gage 33 is provided for indicating the capacity of the tank at a hundred pounds, as the highest pressure. When the tank has received a pressure of a hundred pounds of compressed air, the safety valve automatically opens, thus relieving the pressure.

When the automobile is in motion, the clutch collar is thrown into coöperation with the clutch member which will transmit power to the sprocket 5 by the chain 4. Pumps are then operated, thus forcing air into the storage tank. When the automobile is at rest, the valve 29 is opened, thus permitting a fine jet of air to blast into the buckets of the wheel 28, that is, when it is desired to start the automobile again. While the automobile is in motion, the pumps may be thrown out of operation, after the requisite pressure of air is obtained in the storage tank, by releasing the foot treadle 14, which will allow the clutch collar to disengage from the clutch member by the action of the spring 15.

The invention having been described, what is claimed is new and useful, is:—

1. In combination, a shaft having an arm on the end arranged within an engine cylinder and provided with a fly wheel having buckets at the other end, the engine cylinder having oppositely arranged serrated members, the arm of the shaft having sparking material thereon adapted to coöperate with the serrated members, and means for storing air adapted to be forced against the buckets of the fly wheel, thereby imparting motion to said shaft.

2. In combination, a shaft having an arm on one end arranged within an engine cylinder and provided with a fly wheel having buckets at the other end, the engine cylinder having oppositely arranged serrated members, the arm of the shaft having sparking material thereon adapted to coöperate with the serrated members, an air storage tank having a pipe terminated adjacent the fly wheel for forcing air under pressure into the buckets, a valve in said pipe for controlling the air, and means having controllable connection with the driving axle of automobile for forcing air into the tank.

In testimony whereof I have signed my name to this specification in the presence of two subscribing witnesses.

STONEWALL JACKSON GILL.

Witnesses:
ROBERTA WRENN,
C. C. WHEAT.